United States Patent

Nakayama et al.

Patent Number: 5,100,268
Date of Patent: Mar. 31, 1992

[54] INSERT CLAMPED TOOL

[75] Inventors: Masaaki Nakayama; Masayuki Okawa; Keiichi Nishiyama, all of Tokyo, Japan

[73] Assignee: Mitsubishi Materials Corporation, Tokyo, Japan

[21] Appl. No.: 537,949

[22] Filed: Jun. 14, 1990

[30] Foreign Application Priority Data

Jun. 15, 1989 [JP] Japan .................. 1-69970[U]
Apr. 17, 1990 [JP] Japan .................. 2-101228

[51] Int. Cl.$^5$ .................................. B26D 1/00
[52] U.S. Cl. .................................. 407/104; 407/109
[58] Field of Search .................. 407/104–106, 407/107, 109, 112

[56] References Cited

U.S. PATENT DOCUMENTS

| | | | |
|---|---|---|---|
| 3,243,864 | 4/1966 | Yogus | 407/107 |
| 3,577,618 | 5/1971 | Cashman | 407/104 |
| 3,731,356 | 5/1973 | Gowanlock | 407/104 |
| 4,477,212 | 10/1984 | Kraft | 407/109 |
| 4,480,950 | 11/1984 | Kraft et al. | 407/109 |

FOREIGN PATENT DOCUMENTS

| | | |
|---|---|---|
| 0074601 | 9/1982 | European Pat. Off. . |
| 2936869 | 3/1981 | Fed. Rep. of Germany . |
| 62-255004 | 11/1987 | Japan . |
| 797845 | 1/1981 | U.S.S.R. .............. 407/109 |
| 1133039 | 1/1985 | U.S.S.R. .............. 407/104 |
| 1342606 | 10/1987 | U.S.S.R. .............. 407/107 |
| 1060906 | 3/1967 | United Kingdom .......... 407/104 |

Primary Examiner—Larry I. Schwartz
Assistant Examiner—Kevin J. Carroll
Attorney, Agent, or Firm—Cushman, Darby & Cushman

[57] ABSTRACT

An insert clamped tool includes a tool holder, a cutting insert, a clamp and a pressing mechanism for pressing the clamp to urge the cutting insert against the bottom and the side walls of the insert-receiving pocket. The tool holder includes an insert-receiving pocket formed at a forward end thereof and having a bottom and side walls. The tool holder has an inclined surface sloping inward in a direction away from the insert-receiving pocket. The cutting insert is received on the insert-receiving pocket. The clamp is held into abutting engagement with the cutting insert. The clamp has a sliding face held in contacting engagement with the inclined surface of the tool holder.

2 Claims, 5 Drawing Sheets

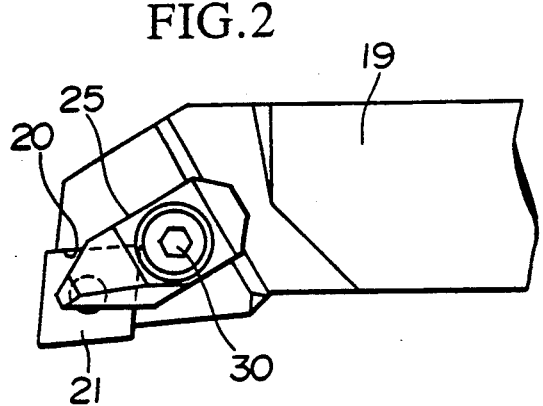
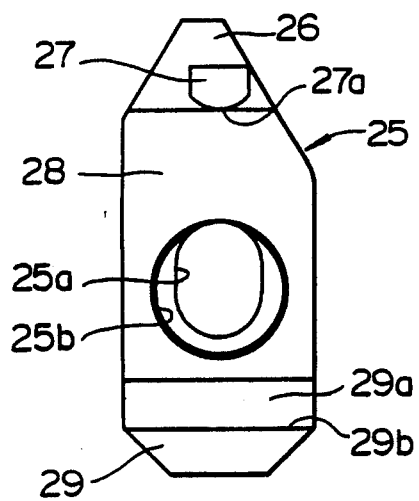
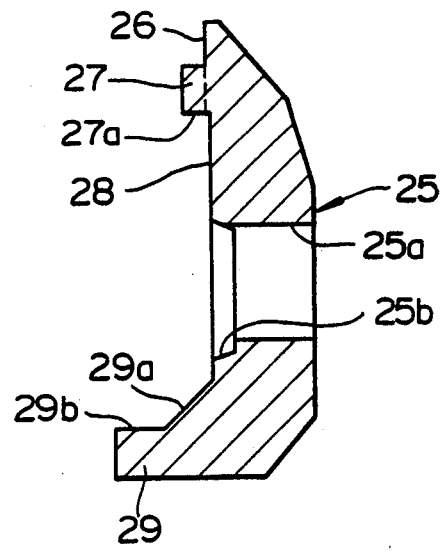
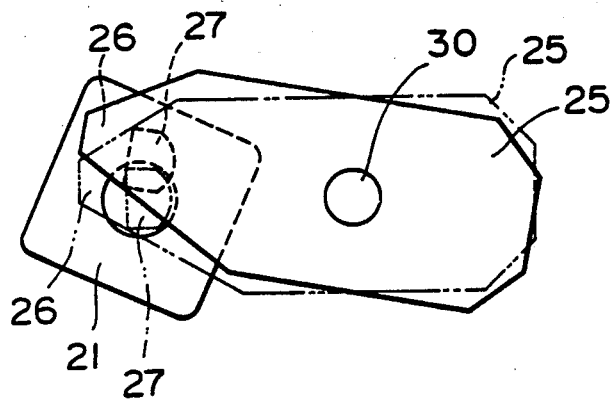
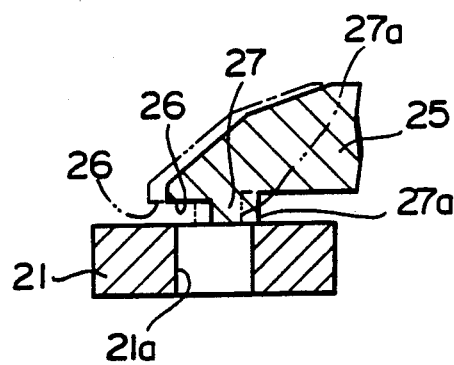

INSERT CLAMPED TOOL

BACKGROUND OF THE INVENTION

1. Field of the Invention

The present invention pertains to a clamped tool having a cutting insert releasably secured to a tool holder by means of a clamp.

2. Prior Art

FIG. 17 depicts a conventional insert clamped tool which comprises a tool holder 4 having a throwaway cutting insert 1 securely fixed thereto by means of an eccentric pin 2 and a clamp 3. A recess is formed at a forward end of the tool holder 4 to provide an insert-receiving pocket 5 which has a bottom 5a and two angularly-disposed side walls 5b, and an internally threaded bore 6 is formed in the bottom 5a. A seat member 7 is disposed on and fixedly secured to the pocket 5 by means of a screw 2a threadedly engaged with the bore 6, and the cutting insert 1 is placed on the seat member 7. The aforesaid eccentric pin 2 is integrally formed at the top end of the screw 2a, while the clamp 3 is arranged adjacent to the insert-receiving pocket 5. An internally threaded bore 4a is formed in the tool holder 4 so as to be displaced rearwardly of the holder with respect to the seat 5, and the clamp 3 has a hole 3a formed therethrough so as to be internally threaded in a direction opposite to the threads of the bore 4a of the tool holder 4. A double-ended clamp screw 8 having opposite threaded portions is threadedly engaged with these bores 3a and 4a.

For securing the cutting insert 1 to the insert-receiving pocket 5, the eccentric pin 2 is turned in a mounting bore 1a of the insert 1 so that its protrusion 2b is brought into pressing engagement with the inner peripheral surface of the mounting bore 1a. With this operation, the insert 1 is pressed against the side walls 5b of the insert-receiving pocket 5. Then, the clamp screw 8 is screwed into the bores 3a and 4a and tightened to cause the clamp 3 to move downward, so that an abutment face 3a formed at the forward end of the clamp 3 is brought into abutting engagement with the upper face of the insert 1 to press the insert 1 toward the bottom 5a of the pocket 5.

Thus, in the aforesaid conventional tool, the insert 1 is secured by the two-stage operation using the eccentric pin 2 and the clamp 3. Therefore, the clamping operation is not efficient. In addition, inasmuch as the number of the parts required is great, their maintenance is laborious.

In order to overcome the above disadvantages, an insert clamped tool as shown in FIG. 18 has been developed. In this modification, a clamp-securing bore 11, which has an internally threaded portion 11a and a countersunk portion 11b of a greater diameter disposed adjacent thereto, is formed in a tool holder 9 so as to be displaced rearwardly of the holder with respect to an insert-receiving pocket 10. As illustrated, the bore 11 is inclined at a prescribed angle $\theta_1$ with respect to an axis of an internally threaded bore 12 for securing the seat member to the holder. A clamp 13 is formed so as to have proximal and distal portions 13a and 13b inclined toward each other. The distal portion 13b includes a pressing portion 14 formed at its foremost end so as to have a curved face and an abutting projection 15 formed adjacent to the pressing portion 14, while the proximal portion 13a includes an aperture 16 having internal threads opposite to those of the threaded portion 11a of the inclined bore 11. In this tool, a double-ended clamp screw 17 having opposite threaded portions is screwed into the aperture 16 of the clamp 13 and into the threaded portion 11a of the bore 11, so that the clamp 13 moves along the bore 11. Thus, the insert 18 is pressed toward the bottom 10a of the pocket 10 by the pressing portion 14 and toward the side walls 10d of the pocket 10 by the protrusion 15, whereby the insert 18 can be firmly secured to the pocket 10.

In the above modified clamped tool, the insert 18 can be easily secured to the tool holder 10 simply by turning the clamp 13. However, small areas of the pressing portion 14 and of the protrusion 15 of the clamp 13 contact the insert 18, and besides the insert is usually made of cemented carbide. Accordingly, when the cutting tool is used for a prolonged period of time, the contact portions are susceptible to wearing. Hence, a further tightening of the clamp 13 is required, or the clamp is ultimately damaged.

Furthermore, an optimal clamping force to be exerted from the clamp 13 to the insert 18 is determined by the angle $\theta_1$ defined between the axis of the inclined bore 11 and that of the threaded bore 12 for securing the seat member. Therefore, the inclined bore 11 must be formed at high precision, resulting in increased manufacturing cost.

SUMMARY OF THE INVENTION

It is therefore an object of the present invention to provide an insert clamped tool in which the insert can be easily secured to the tool holder using a clamp having a prolonged service life, and which can be manufactured at reduced cost.

According to the present invention, there is provided an insert clamped tool comprising a tool holder including an insert-receiving pocket formed at a forward end thereof and having a bottom and at least one side wall, the tool holder having an inclined surface sloping inwardly of the tool holder in a direction away from the insert-receiving pocket; a cutting insert received by the insert-receiving pocket; a clamp arranged on the tool holder and held in abutting engagement with the cutting insert, the clamp having a sliding face held in contacting engagement with the inclined surface of the tool holder; and pressing means arranged on the tool holder for pressing the clamp toward the tool holder to urge the cutting insert against the bottom and the side wall of the insert-receiving pocket.

BRIEF DESCRIPTION OF THE DRAWINGS

FIG. 2 is a plan view of the tool of FIG. 1;

FIG. 4 is a plan view of the clamp;

FIG. 5 is a cross-sectional view of the clamp;

FIGS. 6 and 7 are views schematically showing the states where the clamp is held in engagement with the cutting insert;

DESCRIPTION OF THE PREFERRED EMBODIMENTS OF THE INVENTION

FIGS. 1 to 13 depict an insert clamped tool in accordance with a first embodiment of the present invention.

Figure 1:
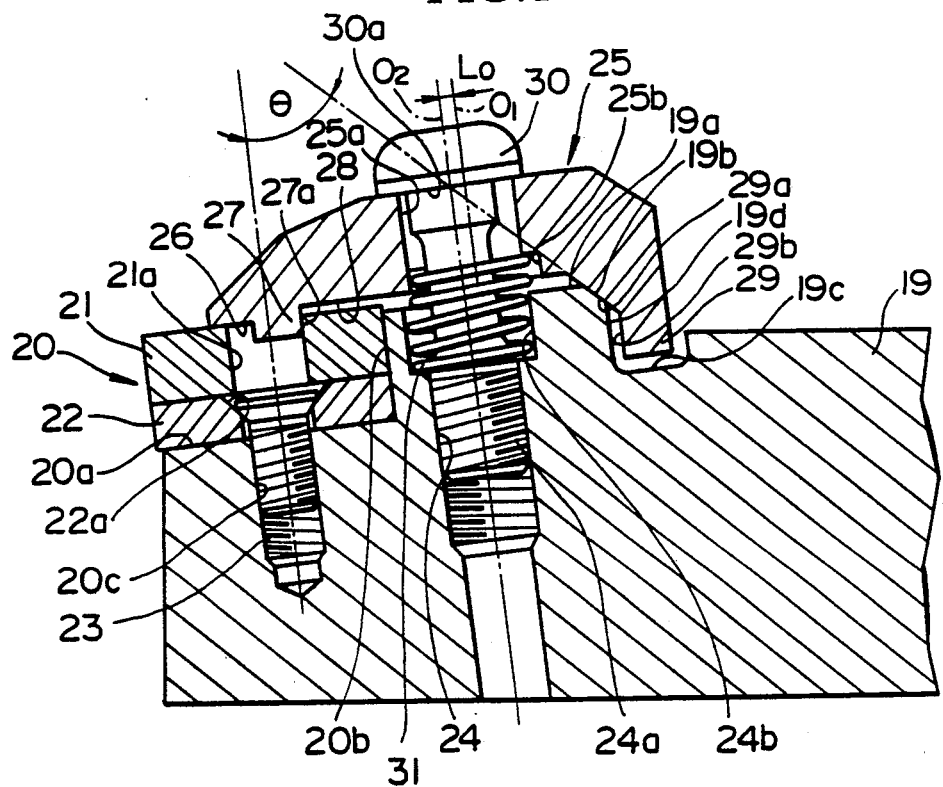
FIG. 1 is a cross-sectional view of a part of an insert clamped tool in accordance with a first embodiment of the present invention.

As shown in FIGS. 1 and 2, the clamped tool comprises a tool holder 19 having an insert-receiving recess or pocket 20 formed in its upper surface 19a at a corner of its forward end portion. The pocket 20 has a bottom 20a and an angularly-disposed two side walls 20b. A throwaway cutting insert 21 having a mounting bore 21a formed therethrough is disposed on the bottom 20a of the pocket 20 with a seat member 22 interposed therebetween. An internally threaded bore 20c is formed in the bottom 20a of the pocket 20 so as to be vertical thereto, and a bore 22a having an upper portion tapering downward is formed through the seat member 22. The seat member 22 is fixedly secured to the insert-receiving pocket 20 by means of a countersunk head screw 23 inserted through the bore 22a and screwed into the threaded bore 20c.

In addition, an inclined surface 19b sloping inwardly from the holder in a direction away from the insert-receiving pocket 20 is formed on that portion of the upper surface 19a of the holder which is displaced rearwardly of the holder with respect to the pocket 20. The inclination angle $\theta$ defined between the inclined surface 19b and the axis of the bore 20c is acute. A recess 19c is formed adjacent to the rearward end of the inclined surface 19b, and defines an engagement wall 19d extending parallel to the bore 20c. A clamp-securing hole 24, which has an internally threaded portion 24a and a countersunk portion 24b of a larger diameter disposed adjacent thereto, is formed in the holder so as to be located between the inclined surface 19b and the insert-receiving pocket 20.

A clamp 25 is arranged on the upper surface 19a of the tool holder 19. As best shown in FIGS. 4 and 5, the clamp 25 is of a generally L-shape in side elevation, and of a rectangular shape with two sides inclining toward each other somewhat at one end as can be seen in the plan view. Formed in the center of the clamp 25 is a through aperture 25a which is of an elliptical cross-section extending longitudinally along the clamp 25 and which has a countersunk portion 25b formed at its lower end so as to have almost the same diameter as the countersunk portion 24b of the tool holder. As shown in FIG. 1, the countersunk portion 25b is formed so that its axis $O_1$ is shifted a distance $L_0$ rearwardly of the holder from the axis $O_2$ of the aperture 25a.

Figure 3:
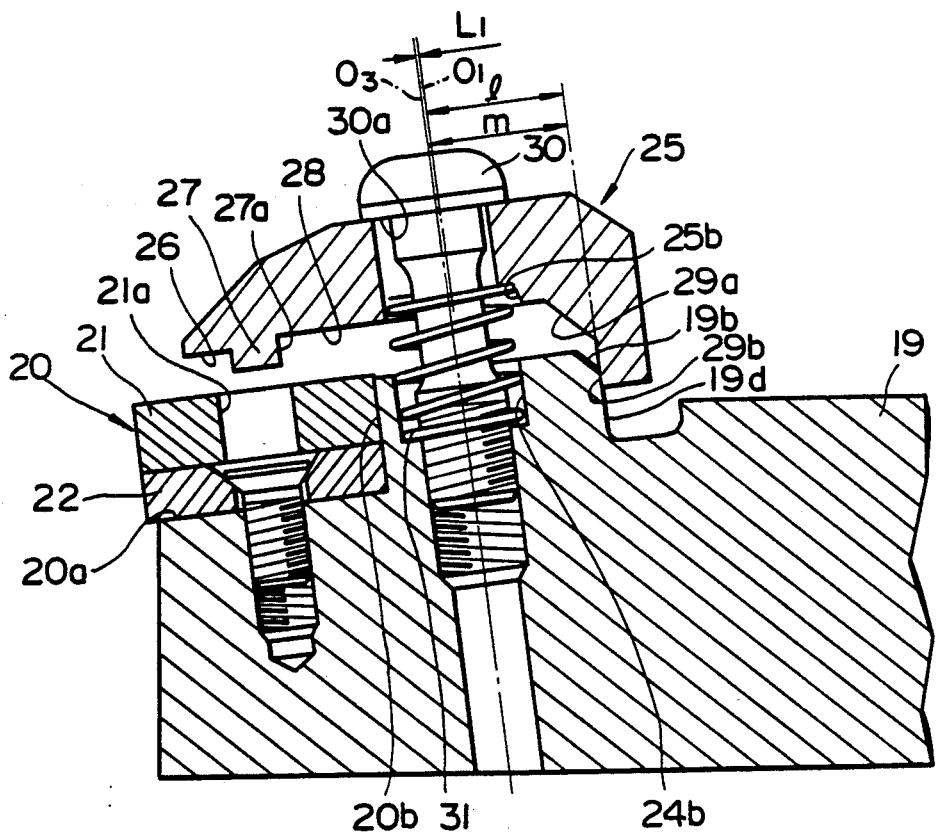
FIG. 3 is a view similar to FIG. 1, but showing the state where a clamp is removed off the upper face of a tool holder.

The lower face of the forward portion of the clamp 25 serves as a pressing face 26 to be held in abutment with the upper face of the insert 21, and a protrusion 27 is formed at a position shifted rearwardly of the holder with respect to the pressing face 26. As also shown in FIG. 3, the protrusion 27 has an arcuately convex side face 27a as viewed in plan. The lower face 28 disposed continuous with the protrusion 27 is formed so as to be positioned higher than the pressing face 26 in FIG. 1.

The clamp 25 has an engagement portion 29 formed at a proximal end thereof so as to protrude downward. The corner into which the lower face 28 and the inner side of the engagement portion 29 merge is inclined at an angle corresponding to the inclination angle $\theta$ of the inclined surface 19b of the holder 19 to define a sliding face 29a complementary with the inclined surface 19b, while that inner side face which is disposed adjacent to and continuous with the sliding face 29a extends perpendicular to the lower face 28.

The clamp 25 is secured to the tool holder 19 by means of a clamp screw 30 which is inserted through the aperture 25a and screwed into the threaded portion 24a. A resilient member in the form of a coil spring 31 which has an outer diameter slightly smaller than the inner diameter of the countersunk portions 24b and 25b is disposed around the clamp screw 30 with its opposite ends inserted in the countersunk portions 24b and 25b.

FIG. 3 depicts the state where the clamp screw 30 is loosened. In this condition, the clamp 25 is moved off the upper surface 19a of the tool holder 19 due to the resilient force of the coil spring 31, and is sandwiched between the head 30a of the clamp screw 30 and the coil spring 31. In addition, the clamp 25 is prevented from moving forward due to the contact of the engagement walls 29b and 19d. The distance l between the axis $O_1$ of the countersunk portion 25b of the clamp 25 and the engagement wall 29b and the distance m between the axis $O_3$ of the countersunk portion 24b of the tool holder and the engagement wall 19d are set so that the axis $O_1$ of the countersunk portion 25b is shifted a distance $L_1$ rearwardly of the holder from the axis $O_3$ of the countersunk portion 24b. Furthermore, in the state shown in FIG. 3, the protrusion 27 of the clamp 25 is kept at a prescribed position above the insert 21 so as to face to the mounting bore 21a of the insert 21 positioned on the insert-receiving pocket 20.

As described above, the axis $O_1$ of the countersunk portion 25b of the clamp 25 is shifted a distance $L_1$ rearwardly of the holder from the axis $O_3$ of the countersunk portion 24b of the tool holder 19. Therefore, the coil spring 31 is caused to curve rearward from the holder in an upward direction, so that the clamp 25 is urged by the restoring force of the spring 31 in a forward direction. Accordingly, since the engagement walls 29b and 19b are always held in contact with each other, the clamp 25 is prevented from turning around the clamp screw 30.

The clamping operation using the clamp 25 will now be described with reference to FIGS. 8 to 13.

Usually, since the clamping operation is required only when replacing the cutting insert with a new one, it is not necessary to move the clamp 25 upward from the position shown in FIG. 3. Therefore, there may be provided a stop member to prevent the clamp screw 30 from being further loosened from the state shown in FIG. 3.

In the state shown in FIG. 3, the clamp screw 30 is first screwed into the clamp-securing hole 24 to cause the clamp 25 to move downward. Since the axis $O_1$ and the axis $O_3$ are shifted from each other by a distance of $L_1$, the clamp 25 is urged forwardly of the holder by means of the coil spring 31. In addition, the engagement walls 29b and 19d are kept in contact with each other. Furthermore, the clamp 25 is sandwiched between the head 30a of the clamp screw 30 and the coil spring 31, and hence the clamp 25 is prevented from turning around the clamp screw 30 due to the rotation of the screw 30. Accordingly, the clamp 25 is guided by the engagement walls 29b and 19d to move downwardly, so that, as shown in FIGS. 6 and 7, the protrusion 27 of the clamp 25 is caused to positively move into the mounting bore 21a of the insert 21 without abutting against the upper face of the insert 21.

Figure 8:
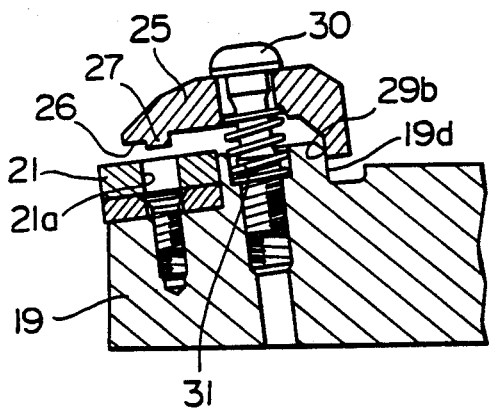
FIGS. 8 to 11 are cross-sectional views showing the method of securing the cutting insert to the tool holder.
Figure 9:
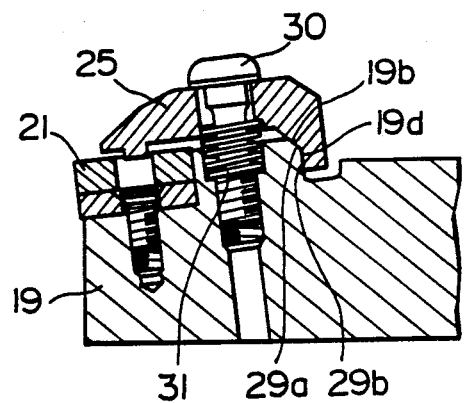

Thereafter, as shown in FIGS. 8 and 9, as the clamp 30 is further tightened, the sliding face 29a and the engagement wall 29b of the clamp 25 are brought into contact with the inclined face 19b and the engagement wall 19d of the holder, respectively, to exert resistance on the proximal end of the clamp 25, so that the proximal end of the clamp is prevented from moving downward.

Figure 10:
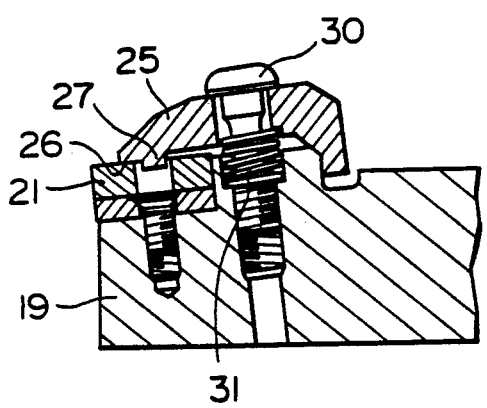

When the clamp screw 30 is further tightened as shown in FIG. 10, only the distal end of the clamp 25 is caused to move downward, and the clamp 25 is caused to become inclined, so that the pressing face 26 of the clamp 25 is brought into abutting engagement with the upper face of the insert 21 while keeping the sliding face 29a and the inclined surface 19b in line contact with each other.

As the clamp screw 30 is still further screwed into the hole 24, the proximal end of the clamp 25 is caused to move obliquely, to bring the sliding face 29a and the inclined surface 19b into planar contact again, and the engagement walls 29b and 19d are caused to move apart. Thus, the protrusion 27 gradually approaches the inner wall of the mounting bore 21a of the insert 21, and the distance between the axis $O_1$ and the axis $O_2$ is enlarged, so that the distortion of the coil spring 31 is increased.

Figure 11:
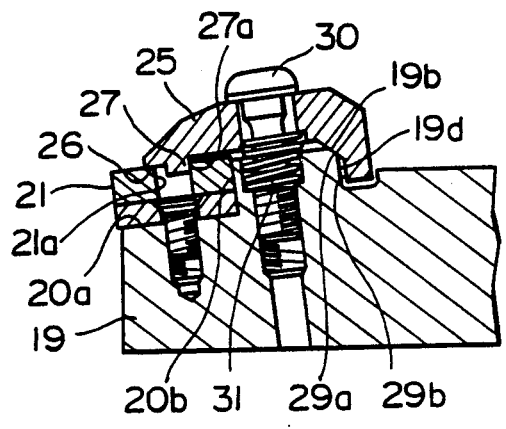

Thus, as shown in FIG. 11, the pressing face 26 of the clamp 25 and the convex face 27 of the protrusion 27 are brought into abutting engagement with the upper face of the insert 20 and the inner wall of the mounting bore 21a of the insert 20, respectively, while keeping the sliding face 29a and the inclined surface 19b in planar contact with each other. Therefore, the insert 21 is pressed toward the bottom 20a of the insert-receiving pocket 20 and toward the side wall 20b thereof, and is firmly secured thereto.

Figure 12:
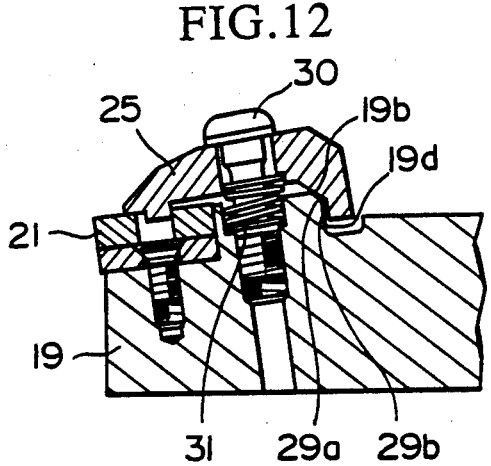
FIGS. 12 and 13 are cross-sectional views showing the states where the clamp is secured to the holder in an inclined manner so that the sliding face of the clamp is held in line contact with the inclined surface of the holder.
Figure 13:
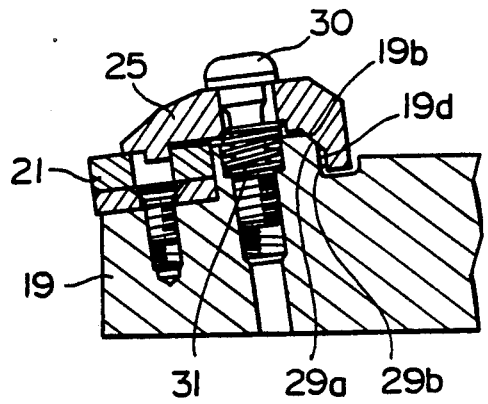

In the foregoing, the size of the clamp 25 is optimally determined in conformity with that of the insert 21. However, the type of the insert to be used may be different. More specifically, as illustrated in FIG. 12, when the insert is of a greater size, the clamp 25 may be positioned so that its lower face is inclined upwardly rearwardly of the holder 19 and the sliding face 29a and the inclined surface 19b are held in line contact with each other. Even in this case, the clamp 25 is urged by the distorted coil spring 31 toward the insert-receiving pocket 20. Therefore, the insert 21 is firmly secured to the pocket 20. Furthermore, as shown in FIG. 13, when the insert 21 is of a smaller size, the sliding face 29a of the clamp 25 is held in line contact with the lower portion of the inclined surface 19b. However, the insert 21 is also firmly secured to the holder.

On the other hand, when removing the insert 21 from the tool holder 19, the clamp 25 is first caused to move obliquely along the inclined surface 19a while being urged upwardly due to the restoring force of the coil spring 31, so that the pressing force against the insert is released. As the engagement walls 29b and 19d are brought into contact with each other, the clamp 25 is caused to move upwardly along the walls, and the sliding face 29 is separated from the inclined surface 19b as shown in FIG. 3. In this released condition, the clamp 25 is sandwiched between the head 30a of the clamp screw 30 and the coil spring 31, and the engagement walls 29b and 19d are held in contact with each other due to the urging force of the coil spring 31. Thus, since the clamp 25 is released so that its protrusion 27 is positioned above the insert 21, the insert 21 can be removed laterally and replaced by a new one. Accordingly, the clamp 25 is released while keeping its attitude as it is, so that the releasing operation can be conducted efficiently.

As described above, the clamp 25 is caused to move downward by means of the clamp screw 30 to bring the insert 21 in pressing engagement with the bottom 20a and the side face 20b, so that a uniform clamping force is exerted on the insert 21 to ensure a normal cutting operation. In addition, the coil spring 31 keeps the clamp 25 and the tool holder 19 in engagement with each other, the tool holder may be manufactured at a reduced precision, so that the manufacturing cost of the cutting tool can be reduced.

Figure 14:
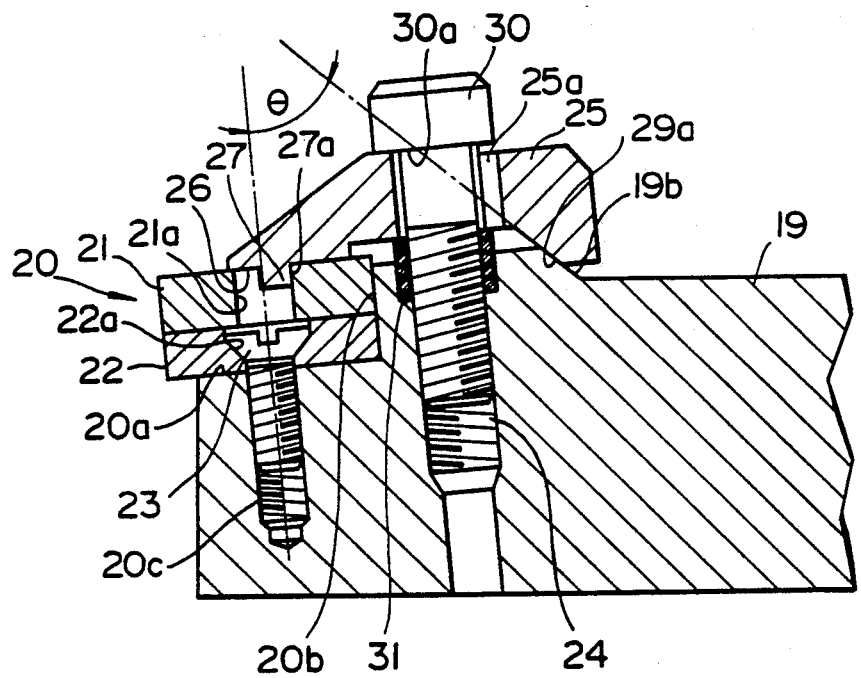
FIG. 14 is a view similar to FIG. 1, but showing another clamped tool in accordance with a second embodiment of the invention.
Figure 15:
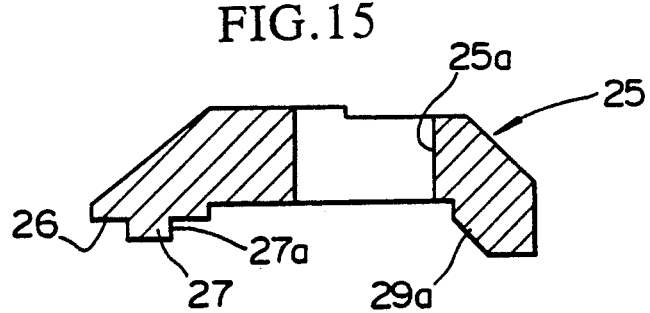
FIG. 15 is a cross-sectional view of a clamp used in the tool of FIG. 13.
Figure 16:
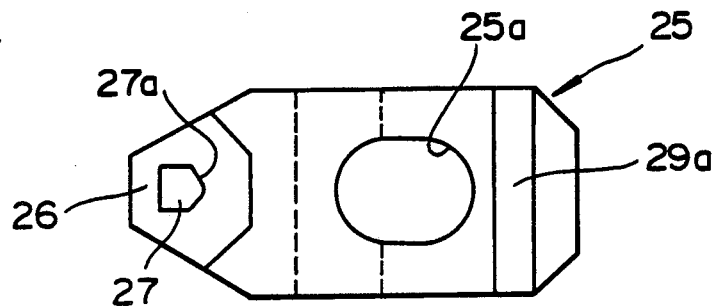
FIG. 16 is a plan view of the clamp of FIG. 14.
Figure 17:
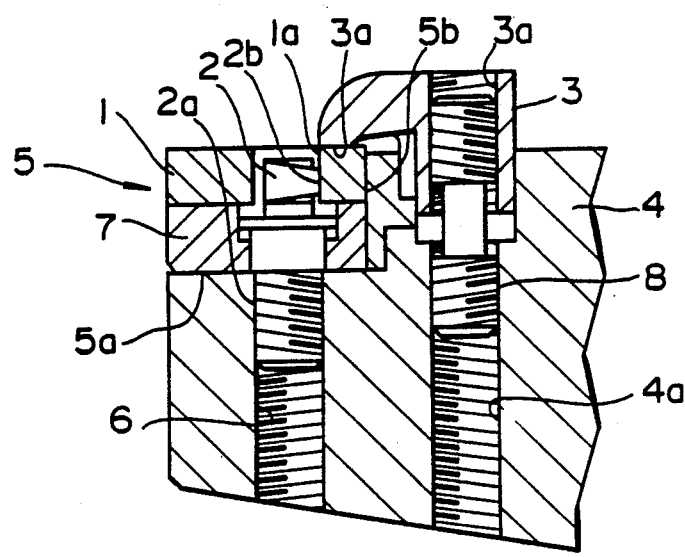
FIG. 17 is a view similar to FIG. 1, but showing a conventional clamped tool.
Figure 18:
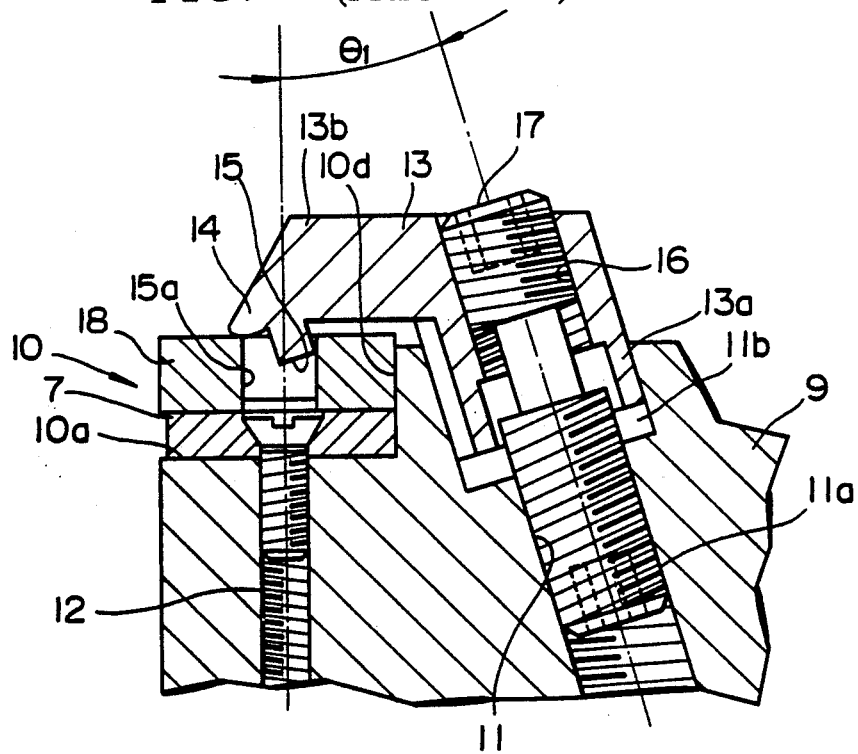
FIG. 18 is a view showing another conventional clamped tool.

FIGS. 14 to 15 depict an insert clamped tool in accordance with a second embodiment of the present invention.

In this embodiment, no countersunk portion 25b is formed in the clamp for receiving the coil spring 31, and the coil spring 31 is only used to urge the clamp 25 upward. In addition, no engagement walls 29b and 19d are formed on the clamp 25 and the holder 19, and when the inclined surface 19b and the sliding face 29a are disengaged from each other, the clamp 25 is disengaged. Thus, in this embodiment, the clamp 25 might be caused to turn around the clamp screw 30 due to the rotation of the screw 30. However, inasmuch as the clamp 25 is sandwiched between the coil spring 31 and the head 30a of the clamp screw 30, it moves upward without turning around the screw so much.

The above modified tool is of a simpler structure and hence the total manufacturing cost of the tool can be further reduced.

In both of the above embodiments, if the angle $\theta$ defined between the inclined surface 19b of the tool holder 19 and the line vertical to the bottom 20a of the insert-receiving pocket 20 is determined so as to range between 30° to 60°, the clamp 25 exerts a uniform clamping force on the insert 21.

In the foregoing, the shape of the insert 21 may be polygonal, circular or the like, and the insert-receiving pocket 20 is formed in conformity with the insert.

What is claimed is:

1. An insert clamped tool comprising:
   (a) a tool holder including an insert-receiving pocket formed at a forward end thereof and having a bottom and at least one side wall, said tool holder having an inclined surface sloping inwardly of said tool holder in a direction away from said insert-receiving pocket, said tool holder including a clamp-securing hole formed therein and having an internally threaded portion;
   (b) a cutting insert received in said insert-receiving pocket and having an upper face and a bore formed therein;
   (c) a clamp arranged on said tool holder and held in abutting engagement with said cutting insert, said clamp having a sliding face held in contacting engagement with said inclined surface of said tool holder, said clamp having a protrusion held in engagement with said bore of said insert and a pressing face held in abutment with the upper face of said insert;

(d) pressing means arranged on said tool holder for pressing said clamp toward said tool holder to urge said cutting insert downwardly and inwardly against said bottom and said side wall of said insert-receiving pocket, said pressing means including a clamp screw inserted through said clamp and threadedly engaged with said internally-threaded portion of said clamp-securing hole; and (e) a resilient member interposed between said clamp and said tool holder for urging said clamp and said tool holder in a direction away from each other, said resilient member comprising a coil spring disposed around said clamp screw so as to act between said clamp and said clamp-securing hole, aid resilient member being arranged such that when said clamp is released from the tool holder, said resilient member urges said clamp upwardly and forwardly of said tool holder, said clamp further including a through aperture having an axis and having a counter-sunk portion formed at a lower end thereof, said counter-sunk portion having an axis shifted a prescribed distance rearwardly of said holder from the axis of said aperture; said clamp-securing hole of said tool holder having a counter-sunk portion; said coil spring being arranged with opposite ends thereof inserted respectively in said counter-sunk portions.

2. A tool according to claim 1, in which said clamp and said tool holder include engagement walls complementary to each other for preventing said clamp from turning around said clamp screw relative to aid tool holder.

* * * * *